(12) United States Patent
Nakagami

(10) Patent No.: US 7,170,026 B2
(45) Date of Patent: Jan. 30, 2007

(54) ARC STUD WELDING DEVICE AND METHOD

(75) Inventor: Hideharu Nakagami, Toyohashi (JP)

(73) Assignee: Newfrey LLC, Newark, DE (US)

( * ) Notice: Subject to any disclaimer, the term of this patent is extended or adjusted under 35 U.S.C. 154(b) by 79 days.

(21) Appl. No.: 11/119,822

(22) Filed: May 3, 2005

(65) Prior Publication Data

US 2005/0252891 A1    Nov. 17, 2005

(30) Foreign Application Priority Data

May 11, 2004    (JP)    ............................ 2004-140765

(51) Int. Cl.
*B23K 9/20*    (2006.01)
(52) U.S. Cl. .......................................... 219/99; 219/98
(58) Field of Classification Search .................. 219/98, 219/99
See application file for complete search history.

(56) References Cited

U.S. PATENT DOCUMENTS

| | | | |
|---|---|---|---|
| 5,321,226 A * | 6/1994 | Raycher ....................... | 219/98 |
| 5,406,044 A | 4/1995 | Killian et al. .................. | 219/99 |
| 5,977,506 A * | 11/1999 | von Daniken ................ | 219/99 |
| 6,011,234 A | 1/2000 | Kirchner et al. .............. | 219/98 |
| 2005/0218119 A1* | 10/2005 | Kondo et al. .................. | 219/98 |

FOREIGN PATENT DOCUMENTS

| | | |
|---|---|---|
| JP | 5-000376 | 1/1993 |
| JP | 7-009146 | 1/1995 |
| JP | 7-9146 | 1/1995 |
| JP | 7-136766 | 5/1995 |
| JP | 11-077310 | 3/1999 |

* cited by examiner

*Primary Examiner*—Clifford C. Shaw
(74) *Attorney, Agent, or Firm*—Miles & Stockbridge P.C.

(57) ABSTRACT

In an arc stud welding device and method, after initial contact of a stud with a component (welded component) to which it is to be welded, the stud is lifted by an amount that permits a proper arc to be formed, even if the welded component was depressed by the initial contact with the stud. After melting of the tip of the stud and a portion of the welded component, the stud is pressed securely into the welded component to weld the stud to the welded component, with the welded component being depressed by the stud to an extent greater than that caused by the initial contact.

10 Claims, 2 Drawing Sheets

ARC STUD WELDING DEVICE AND METHOD

CROSS-REFERENCE TO RELATED APPLICATION

This application claims the benefit of Japanese Patent Application No. 2004-140765 filed May 11, 2004, incorporated herein by reference.

BACKGROUND OF THE INVENTION

The present invention relates to an arc stud welding device and method using an arc discharge in which electric power is applied between a welding component such as a stud, nut or tube, and a welded component, such as a car body or metal panel, in order to generate an arc, melt the welding component and a portion of the welded component, and weld the welding component to the welded component.

So-called drawn arc stud welding is well known. In this type of arc discharge stud welding, electric power is applied between a welding component such as a stud and a welded component such as a car body, a low current pilot arc followed by a high current main arc are generated between the welding component and welded component separated from one another, and the welding component is welded to the welded component.

One type of arc stud welding device is disclosed in Unexamined Patent Application Publication (Kokai) No. 07-009146 (Patent Document 1). In the device described in Patent Document 1, a linear motor is used in the welding tool, the configuration of the welding tool holding the stud is simplified, and the positioning of the stud over the welded component is made easier. As described in Paragraphs 0025 and 0026 of Patent Document 1, the linear motor is operated so as to raise the welding component from a reference plane of the welded component to a pre-determined height, an arc is generated between the components, and the melted tip of the welding component is pressed into the melted portion of the welded component to a predetermined sink-in depth.

In Unexamined Patent Application Publication (Kokai) No. 07-136766 (Patent Document 2), a circuit is installed to detect contact between a stud and a welded component, and the contact between the stud and the welded component is monitored to ensure the start of welding. In Unexamined Patent Application Publication (Kokai) No. 11-077310 (Patent Document 3), the lift-up distance for a stud with respect to a welded component and the push-in depth for the stud with respect to the welded component after the lift up, are preset, the lift-up distance and push-in depth are monitored to determine whether or not they are within the tolerances for preset values, and the pass or fail quality of the welding is checked. In Unexamined Patent Application Publication (Kokai) No. 05-000376 (Patent Document 4), a stud welding device is disclosed that is able to weld a stud to various types of welded components with different shapes. Correction control is performed by feed-back of the amount of movement to position the stud in the welding tool over a predetermined position on the welded component.

Generally, in arc stud welding, the welding component is pressed into a portion of the welded component, and electric power is applied to the welding component and the welded component in contact with one another. A linear motor is operated to lift the welding component from the welded component, an arc is generated, and a tip of the welding component and the welded portion of the welded component are melted. The welding component is then pressed into the welded component, and the welding component is welded to the welded component. Since the welding component is forcibly brought into contact with the welded component at the start of the welding operation, if the welded component is not sufficiently rigid, the pressure applied to the welded component may cause it to become bowed or bent, forming a depression, and cause the welded component to sink to a sink-in depth below its original welded plane.

When the welding component is lifted for generating the arc, the welding component is usually lifted to a predetermined height above the position where the welding component came into contact with the welded component. However, if the applied pressure has caused the welded component to become bowed or bent, it may return to its original plane when it is no longer under pressure. Lifting of the welding component to the predetermined height from the bowed or bent position may not be sufficient to permit generating a proper arc, which may cause defective welding. When the sink-in depth is greater than the predetermined lift-up height, the rebound of the welded component causes the welding component to remain in contact therewith even after the welding component has been lifted. Thus, an arc cannot be generated. Patent Documents 1 through 4 do not meaningfully address this problem.

Also, when the welded component is not sufficiently rigid and sinks below its original plane, the welding component may not apply sufficient pressure to the welded component until the sink-in depth is reached, which may cause defective welding. Patent Documents 1 through 4 do not meaningfully address this problem.

A tube-shaped component called a flash shield may be placed around the head on the welding tool in an effort to hold the lift-up distance and the sink-in distance constant. Space is needed for a flash shield of fixed size to make contact with the portion of the welded component to be welded, but proper welding cannot be performed if the location or shape of that portion of the welded component does not provide enough space to accommodate the flash shield.

BRIEF DESCRIPTION OF THE INVENTION

An object of the present invention is to provide an arc stud welding device and method in which a welding component (first component) is lifted by an appropriate amount to permit generation of a proper arc, even if the welded component (second component) has been forcibly depressed by the welding component to a sink-in depth before melting, and in which the welding component is lowered by an appropriate amount and a push-in depth is reached after melting.

In a preferred, but non-limiting embodiment, the present invention provides an improved stud welding device and method for welding a welding component, such as a stud, to a welded component, such as a panel, using an arc discharge. The welding device includes a welding tool with a head for holding a welding component. The welding tool comprises a linear motor for lowering the welding component and pressing the welding component against the welded component and for raising the welding component from the welded component. A position sensor detects the position of the welding component relative to the welded component, and a contact detector detects contacting of the welding component with the welded component. The welding tool is connected to a power supply for supplying electric power. A controller-controls the power supply and the linear motor.

The controller supplies electric power to both components after contact between the welding component and the welded component is detected and maintains the supply of power so that an arc is generated between the components when the linear motor lifts the welding component to a predetermined lift-up height from a reference plane of the welded component, to melt a tip of the welding component and a portion of the welded component.

The linear motor is then operated to lower the welding component and push the melted tip of the welding component into the melted portion of the welded component until a predetermined push-in depth is reached, so as to establish secure contact between the welding component and the welded component and weld them together.

If the welded component is not sufficiently rigid, and the welded component sinks below its original plane to a sink-in depth when the welding component is pressed into the welded component before being lifted, the sink-in depth is measured, based on signals from the contact detector and signals from the position sensor, in order to lift the welding component by an amount corresponding approximately to the sum of the sink-in depth and the predetermined lift-up height. After melting, the linear motor is operated to press the welding component against the welded component with a downward stroke corresponding approximately to the sum of the lift-up height, the sink-in depth, and the push-in depth.

Therefore, even if the welded component is bowed or bent by the pressure from the welding component, the welding component can be lifted to the proper height for arc welding, and the welding component can be pressed into the welded component to the proper depth after melting. A flash shield is not required, and defective welding is minimized.

In the arc stud welding device and method of the invention, the controller is preferably configured to operate the linear motor so as to push the melted welding component into the melted portion of the welded component using a pressure application identical to the first pressure application when the welding component was first brought into contact with the welded component before melting. This promotes proper push-in depth. Also, the sink-in depth is preferably determined using the original reference plane for the welded component. The controller preferably includes a system control unit and a linear motor control unit, and the linear motor control unit is preferably housed inside the welding tool or a welding component supply device arranged adjacent to the welding tool. Operation of the welding tool head holding the welding component is performed using feedback control, and the controller is positioned near the welding tool. The control circuit is simple and does not take up much space.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
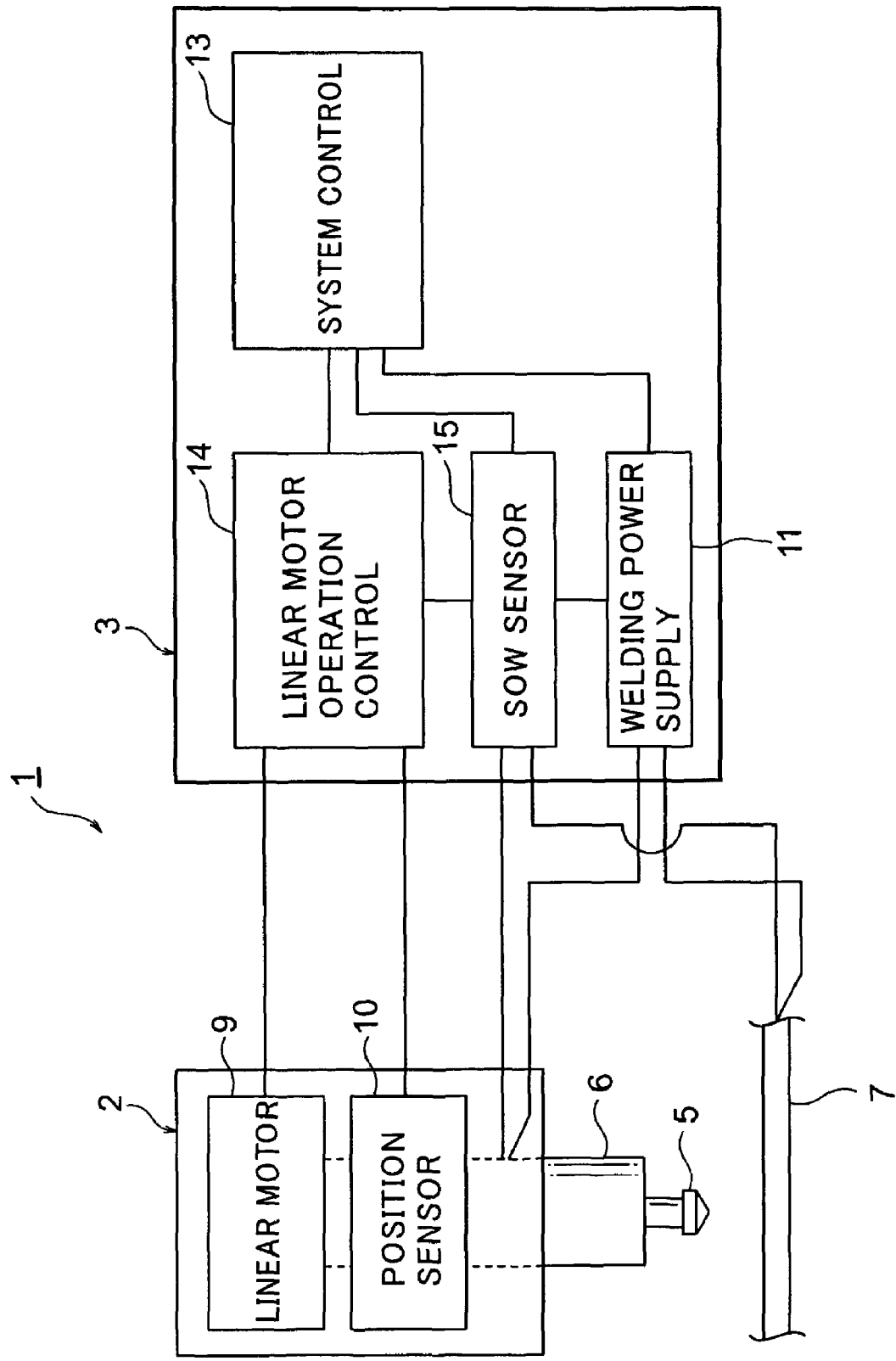
FIG. 1 is a block diagram of an arc stud welding device in a first embodiment of the present invention.

The following is an explanation of a non-limiting embodiment of the present invention with reference to the drawings. In FIG. 1, the arc stud welding device 1 of the present invention comprises a welding tool 2 and a controller 3 accommodated in a housing separate from the welding tool 2. However, the controller 3 can also be accommodated in the same housing as the welding tool 2 to create an integrated arc stud welding device 1. If separate, the welding tool 2 can be operated using a manipulator such as a robotic arm. The arc stud welding device 1 welds a stud 5 serving as the welding component to a car body 7 serving as the welded component, at a predetermined position. Although in this explanation the welding component is a stud 5, it could be a nut, bolt or tube, for example. Also, the welded component could be any appropriate panel or base.

The welding tool 2 has a head 6 at the tip for holding the stud 5, and a linear motor 9 moving axially for bringing the stud 5 held by the head 6 into contact with the welded component 7 and then separating them. The welding tool 2 also has a position sensor 10 for detecting the position of the stud 5 relative to the welded component 7, or the distance between the stud 5 and the welded component 7, and outputs position signals to the controller 3. The position sensor 10 can take any appropriate form as long as it detects the position of the stud 5 relative to the welded component 7 and outputs position signals. For example, the position sensor 10 can be fixed to the head 6 holding the stud 5 and moved by the linear motor 9, using a scale consisting of holes formed at predetermined intervals along the axis of movement. A light emitting element (LED) and a light receiving element can be fixed to the housing of the welding tool 2 and arranged to emit and receive a light beam interrupted by the scale. As the scale moves relative to the light beam, a pulse signal is outputted each time a light pulse is received by the light receiving element through one of the holes. Alternatively, an optical position encoder can be used if patterns with different shapes are formed for the contact holes corresponding to their height. In this case, the output from the position sensor is a code signal corresponding to the position. When an optical position sensor is used, the adverse effect of noise caused by the welding current can be reduced. A welding power source 11 is disposed in the controller 3 to generate an arc discharge between the stud 5 held by the head 6 in the welding tool 2 and the welded component 7.

A system control unit 13 is also disposed in the controller 3. The system control unit 13 controls the series of welding operations performed to weld the stud 5 to the welded component 7, in which the stud 5 is pressed down onto the welded component 7 to establish contact therewith, power is applied from the welding power supply 11 to the welded component and the stud, the linear motor 9 is operated to lift the stud from the welded component, a pilot arc is generated, the stud is lifted more and a large current main arc is generated, the stud tip and a portion of the welded component are melted, and the linear motor is operated after melting to press the stud into the melted portion of the welded component and weld them together. In order to perform these operations, the system control unit 13 preferably comprises a calculation processor such as a microprocessor, RAM and ROM for storing programs and data, a memory device such as a hard drive, a user interface such as a keyboard and a monitor display, and other devices to perform operations according to a predetermined program.

A linear motor operation control unit 14 is also disposed in the controller 3 to send control signals from the system control unit 13 to the linear motor 9 in the stud welding tool 2 as operation signals. In the linear operation control unit 14, position signals are inputted from the position sensor 10 in the welding tool 2, and the position signals are used to perform feedback control when command signals are received from the system control unit 13 and operate the linear motor 9 with great precision. The linear motor operation control unit 14 shown in the drawing is housed inside a box in the controller 3. However, it can be housed inside the welding tool 2 or inside the stud supplying device (not shown) for automatically supplying studs 5 to the head 6. When the linear motor operation control unit 14 is housed inside the welding tool 2 or inside the stud supplying device, it is preferably positioned near the linear motor 9 to be controlled. This is convenient when performing feedback control of the movement of the linear motor 9. It also allows for a simple control circuit configuration and takes up less space.

An SOW (stud on workpiece) detection circuit 15 is disposed in the controller 3 as a contact detector for detecting contact of the stud 5 with the welded component 7. This circuit is connected to the head 6 of the welding tool 2. The SOW detection circuit 15 detects when the stud 5 makes contact with the welded component 7 at the beginning of the welding operation. For example, it can detect the electric current flowing between the welded component 7 and the head 6 holding the stud 5 so as to detect when the stud 5 makes contact with the welded component 7. In another example, voltage is supplied from the welding power supply 11 between the stud 5 and the welded component 7 when the stud 5 is apart from the welded component 7. Electric current flows between the stud 5 and the welded component 7 when the stud 5 makes electrical contact with the welded component 7, reducing the voltage between the stud 5 and the welded component 7 almost to 0 V and thereby detecting contact. The signals from the SOW detection circuit 15 are sent to both the system control unit 13 and the linear motor operation control unit 14. The signals from the SOW detection circuit 15 can be used to detect separation between the stud 5 and the welded component 7 as well as contact between the stud 5 and welded component 7.

The following is an explanation, with reference to FIGS. 2(a) through (f), of an operation performed by an arc stud welding device 1 with the described configuration, to weld a stud 5 at a predetermined position on the welded component 7. In FIG. 2(a), the stud 5 is held in the stud holder 6 on the welding tool 2 at a predetermined position over the welded component 7. After positioning of the stud 5, a linear motor drive command is sent to the linear motor operation control unit 14 from the system control unit 13 in the controller 3. The linear motor 9 in the welding tool 2 is operated and, as shown in FIG. 2(b), the head 6 is lowered, and the stud 5 is forcibly pressed against the welded component 7 under the first pressure application F1, so that the stud 5 comes into secure contact with the welded component 7. This contact is detected by the SOW detection circuit 15. If the welded component 7 is sufficiently rigid, the welded component 7 does not become bowed or bent when the stud 5 is pressed against it under first pressure application F1. However, if the welded component 7 is not sufficiently rigid, the welded component 7 becomes bowed or bent as shown in FIG. 2(c), and the portion to be welded sinks to a sink-in depth 17. The vertical position of the portion of the welded component 7 sunk in to the sink-in depth 17 is then the reference position 18 for the head 6 of the welding tool 2.

A method used to measure the sink-in depth 17 is to lower the head 6, bring the stud 5 into contact with the welded component 7 under first application pressure F1, and then use the SOW detection circuit 15 to detect the position signal from the position sensor 10 the instant the stud 5 is determined to have come into contact with the welded component 7 and the position signal from the position sensor 10 when the welded portion of the welded component 7 has sunk in and stopped. First pressure application F1 is the same as pressure application F(p) (see FIG. 2(e)) when the stud 5 is pressed against the welded component 7 after melting. The timing for the sink-in depth 17 measurement is begun when the stud 5 comes into contact with the welded component 7. The various welding positions can be measured in preliminary tests before implementing a desired welding operation, so the sink-in depth 17 can be measured and stored beforehand in the system control unit 13.

When the stud 5 has been pressed against the welded component 7 and secure electric contact has been established between the stud 5 and the welded component 7, a signal is sent from the system control unit 13 in the controller 3 to the linear motor operation control unit 14, and a lift signal is sent from the linear motor operation control unit 14 to the linear motor 9. The linear motor 9 lifts the head 6, and the stud 5 is lifted from the welded component 7. When the lifting of the stud 5 releases the application pressure F1 on the welded component 7, the depressed portion of the welded component 7 rebounds from the reference position 18 to its original position, and the stud 5 and welded component 7 remain in electrical contact.

The system control unit 13 supplies low voltage from the welding power source 11 to the stud 5 and the welded component 7. The linear motor 9 continues to lift the stud until a position signal is received by the linear motor operation control unit 14 from the position sensor 10 indicating that the stud has been lifted by an amount corresponding approximately to the sum of the sink-in depth 17 and the predetermined lift-up height 19. As a result, the stud 5 is lifted by the linear motor 9 to the predetermined lift-up height 19 above the rebounded welded component 7, as shown in FIG. 2(d).

A pilot arc is generated when the stud 5 is lifted up. The system controller 13 then increases the power from the welding power supply 11 and generates a main arc between the stud 5 and the welded component 7, as shown in FIG. 2(d). The pilot arc and then the main arc are formed properly between the stud 5 and the welded component 7 at the lift-up height 19. Thus, defective welding due to insufficient lifting of the stud does not occur.

The main arc is generated continuously for a fixed period of time until the flange-shaped portion of the stud 5 and a predetermined portion of the welded component 7 have been melted. The system control unit 13 then outputs a signal to the linear motor 9 via the linear motor operation control unit 14 to lower the stud 5. As shown in FIG. 2(e), the melted portion of the stud 5 is lowered into the melted portion of the welded component 7, and the stud 5 is pushed (or "plunged") into the welded component 7 under pressure application F(p) to weld the components. Because both the tip of the stud 5 and the welded portion of the welded component 7 have both been melted at the time of the plunge, strong and reliable welding is obtained.

Figure 2:
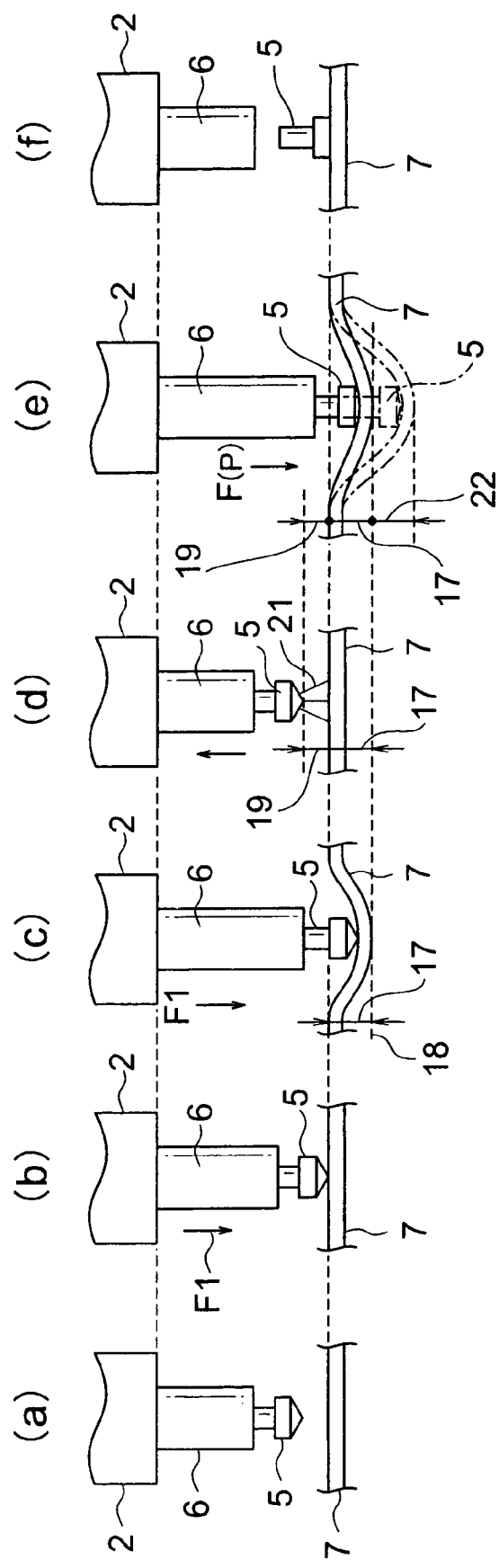
FIGS. 2(a) through (f) are diagrams of a welding operation performed by the arc stud welding device, (a) showing a stud held by the welding tool head, (b) showing the stud making initial contact with the welded component, (c) showing the stud being forcibly applied to the welded component and forming a depression in the welded component, (d) showing the stud being raised from the welded component for generation of an arc between the stud and the welded component, (e) showing the melted tip of the stud being forcibly inserted into the melted portion of the welded component, and (f) showing the stud welded to the welded component and separated from the tool head.

If the welded component were flat at this time, the stud would be pushed in only to a predetermined push-in depth from an original reference plane. In the present application, proper welding is obtained even when the welded component 7 has previously sunk in as shown in FIG. 2(*c*). The linear motor 9 is controlled to move downward by an amount corresponding approximately to the sum of the sink-in depth 17, the lift-up height 19, and a predetermined push-in depth 22. As is evident in FIG. 2(*e*), the total depression of the welded component 7, after melting, is greater than that shown in FIG. 2(*c*) prior to melting. By making the downward stroke of the head 6 in FIG. 2(*e*) correspond approximately to the sum of the lift-up height 19, the sink-in depth 17, and push-in depth 22, proper welding is obtained and the welding process is completed with the welding head 6 lifted and separated from the stud 5, now welded to the rebounded welded component 7, as shown in FIG. 2(*f*).

While a preferred embodiment of the invention has been shown and described, changes can be made without departing from the principles and spirit of the invention, the scope of which is defined in the following claims. For example, although the foregoing description of the invention refers to vertical movement of a welding component with respect to a welded component, the invention is not limited to such an orientation.

What is claimed is:

1. An arc discharge welding device for welding a first component to a second component and including a welding tool with a head for holding the first component and a motor for moving the head toward and away from the second component, and including a controller for controlling a supply of electric power for forming an arc discharge between the first and second components and for operating the motor,
    wherein the controller is constructed to operate the motor to move the head with the first component in a first direction toward the second component to press the first component into the second component and to depress the second component by an amount corresponding to a sink-in depth with respect to a reference plane, and then to move the head with the first component in an opposite direction by an amount corresponding approximately to the sum of the sink-in depth and a predetermined lift-up height, and
    wherein the controller is constructed to cause an arc discharge to be formed between the lifted first component and the second component and then to operate the motor to move the head with the first component in the first direction again to press an arc-discharge-melted portion of the first component into an arc-discharge-melted portion of the second component and to depress the melted portion of the second component by an amount corresponding to the sum of the sink-in depth and a predetermined push-in depth, so that the first component is welded to the second component, and then to operate the motor to move the head in the opposite direction again to release the first component from the head of the welding tool.

2. A device according to claim 1, wherein the motor is a linear motor.

3. A device according to claim 1, wherein a pressure used in pressing the first component into the second component before melting is the same as a pressure used in pressing the first component into the second component after melting.

4. A device according to claim 1, wherein the device has a position sensor that senses the position of the first component relative to the second component and sends position signals to the controller.

5. A device according to claim 4, wherein the device has a contact detector that detects contact of the first component with the second component and provides contact signals, and wherein the device uses position and contact signals to measure the sink-in depth.

6. A device according to claim 1, wherein the amount of movement of the head with the first component in the first direction after melting corresponds approximately to the sum of the lift-up height, the sink-in depth, and the push-in depth.

7. An arc discharge welding method for welding a first component to a second component, comprising:
    supporting the first component on a head of a welding tool at a position spaced from the second component;
    moving the head in a first direction toward the second component to press the first component into the second component and to depress the second component by an amount corresponding to a sink-in depth with respect to a reference plane;
    moving the head in an opposite direction by an amount corresponding approximately to the sum of the sink-in depth and a predetermined lift-up height;
    forming an arc discharge between the components to melt portions of the components;
    moving the head in the first direction again to press the melted portion of the first component into the melted portion of the second component and to depress the melted portion of the second component by an amount corresponding to the sum of the sink-in depth and a predetermined push-in depth, so that the first component is welded to the second component, and then moving the head, without the first component, in the opposite direction again.

8. A method according to claim 7, wherein a pressure used in pressing the first component into the second component before melting is the same as a pressure used in pressing the first component into the second component after melting.

9. A method according to claim 7, wherein positions of the first component relative to the second component are detected to produce position signals, contacting of the first component with the second component is detected to produce contact signals, and position and contact signals are used to measure the sink-in depth.

10. A method according to claim 7, wherein the amount of movement of the first component in the first direction after melting corresponds approximately to the sum of the lift-up height, the sink-in depth, and the push-in depth.

* * * * *